United States Patent
Fahs et al.

(10) Patent No.: US 9,697,006 B2
(45) Date of Patent: Jul. 4, 2017

(54) TECHNIQUE FOR PERFORMING MEMORY ACCESS OPERATIONS VIA TEXTURE HARDWARE

(71) Applicant: NVIDIA CORPORATION, Santa Clara, CA (US)

(72) Inventors: Brian Fahs, San Jose, CA (US); Eric T. Anderson, Palo Alto, CA (US); Nick Barrow-Williams, San Francisco, CA (US); Shirish Gadre, Fremont, CA (US); Joel James McCormack, Boulder, CO (US); Bryon S. Nordquist, Santa Clara, CA (US); Nirmal Raj Saxena, Los Altos Hills, CA (US); Lacky V. Shah, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 209 days.

(21) Appl. No.: 13/720,746

(22) Filed: Dec. 19, 2012

(65) Prior Publication Data

US 2014/0173258 A1 Jun. 19, 2014

(51) Int. Cl.
*G06F 12/10* (2016.01)
*G06F 9/38* (2006.01)
(Continued)

(52) U.S. Cl.
CPC .......... *G06F 9/3887* (2013.01); *G06F 9/3851* (2013.01); *G06F 12/0284* (2013.01);
(Continued)

(58) Field of Classification Search
CPC combination set(s) only.
See application file for complete search history.

(56) References Cited

U.S. PATENT DOCUMENTS

| 5,798,762 A | 8/1998 | Sfarti |
| 6,642,928 B1 | 11/2003 | Deming et al. |

(Continued)

FOREIGN PATENT DOCUMENTS

| TW | I265707 B | 11/2006 |
| TW | 200817899 A | 4/2008 |

(Continued)

OTHER PUBLICATIONS

GPU Gems 2: Chapter 32, "Taking the Plunge into GPU Computing." http://http.developer.nvidia.com/GPUGems2/gpugems2_chapter32.html.

(Continued)

*Primary Examiner* — Robert Craddock
(74) *Attorney, Agent, or Firm* — Artegis Law Group, LLP

(57) ABSTRACT

A texture processing pipeline can be configured to service memory access requests that represent texture data access operations or generic data access operations. When the texture processing pipeline receives a memory access request that represents a texture data access operation, the texture processing pipeline may retrieve texture data based on texture coordinates. When the memory access request represents a generic data access operation, the texture pipeline extracts a virtual address from the memory access request and then retrieves data based on the virtual address. The texture processing pipeline is also configured to cache generic data retrieved on behalf of a group of threads and to then invalidate that generic data when the group of threads exits.

15 Claims, 10 Drawing Sheets

(51) Int. Cl.
*G06F 12/0844* (2016.01)
*G06F 12/0815* (2016.01)
*G06F 12/02* (2006.01)

(52) U.S. Cl.
CPC ...... *G06F 12/0815* (2013.01); *G06F 12/0844* (2013.01); *G06F 2209/5018* (2013.01); *G06F 2212/604* (2013.01)

(56) References Cited

U.S. PATENT DOCUMENTS

| | | | |
|---|---|---|---|
| 6,664,958 B1 | 12/2003 | Leather | |
| 6,851,038 B1 | 2/2005 | Krolski et al. | |
| 6,885,378 B1 | 4/2005 | Tsai | |
| 6,972,769 B1 * | 12/2005 | Nebeker et al. | 345/552 |
| 7,290,116 B1 | 10/2007 | Grohoski et al. | |
| 7,492,368 B1 | 2/2009 | Nordquist | |
| 7,537,773 B1 | 5/2009 | Borodic | |
| 7,793,038 B2 | 9/2010 | Blumrich et al. | |
| 7,945,757 B1 | 5/2011 | Wilt | |
| 2004/0153598 A1 * | 8/2004 | Thatipelli et al. | 711/5 |
| 2004/0172497 A1 | 9/2004 | Liou | |
| 2007/0091089 A1 * | 4/2007 | Jiao et al. | 345/426 |
| 2007/0113055 A1 * | 5/2007 | Dale et al. | 712/228 |
| 2009/0198893 A1 | 8/2009 | Sorgard et al. | |
| 2009/0201711 A1 | 8/2009 | Solomon et al. | |
| 2010/0228912 A1 | 9/2010 | Huang et al. | |
| 2011/0252180 A1 | 10/2011 | Hendry et al. | |
| 2012/0239854 A1 * | 9/2012 | Hsueh et al. | 711/103 |

FOREIGN PATENT DOCUMENTS

| | | |
|---|---|---|
| TW | 200941496 A | 10/2009 |
| TW | 201037514 A1 | 10/2010 |
| TW | 201235843 A1 | 9/2012 |

OTHER PUBLICATIONS

Non-final Office Action for U.S. Appl. No. 14/038,599, dated Feb. 12, 2016, 18 pages.
Final Office Action for U.S. Appl. No. 14/038,599, dated Jul. 6, 2016, 37 pages.

* cited by examiner

TECHNIQUE FOR PERFORMING MEMORY ACCESS OPERATIONS VIA TEXTURE HARDWARE

BACKGROUND OF THE INVENTION

Field of the Invention

The present invention generally relates to memory access operations and, more specifically, to a technique for performing memory access operations via texture hardware.

Description of the Related Art

A conventional graphics processing unit (GPU) includes texture processing hardware configured to perform a variety of texture-related operations, including texture load operations and texture cache operations. A graphics program developer may generate shader programs that make use of this texture processing hardware in order to render a three-dimensional graphics scene.

In recent years, program developers have begun to generate shader programs that perform arbitrary, non-graphics-oriented operations that leverage the parallel processing architecture of the GPU. However, given the architecture of the texture processing hardware, those memory access operations must be carefully designed to resemble texture processing operations. For example, a typical texture access operation reads two-dimensional (2D) texture data from memory based on 2D coordinates and dimensions associated with the texture. In order to generate a shader program that is capable of loading non-texture data, a program developer must explicitly declare all data elements as having 2D coordinates and dimensions that reflect a 2D data structure similar to a texture, regardless of the actual dimensions associated with that data.

The above approach is problematic because creating a shader program that performs arbitrary computations requires extensive knowledge of texture processing operations, and many program developers who wish the leverage the parallel processing architecture of GPUs lack such knowledge. These requirements create a considerable barrier to entry for many program developers.

One solution to this problem is to create a separate data pathway for generic memory access operations in addition to the existing texture processing hardware. With this approach, program developers who wish to perform processing operations with arbitrary non-texture data can simply write programs that rely on this separate pathway. However, this approach is problematic because conventional GPUs simply lack the space required to integrate additional data pathways, and increasing the GPU size is costly.

Accordingly, what is needed in the art is a more effective technique for performing generic data access operations via texture processing hardware.

SUMMARY OF THE INVENTION

A computer-implemented method for performing a data access operation, including receiving a memory access request from a thread within the group of threads, determining that a portion of data associated with the memory access request is not present in a cache memory unit, retrieving the portion of data associated with the memory access request from global memory, storing the portion of data within the cache memory unit during execution of the threads within the thread group, and flushing the portion of data from the cache memory unit upon determining that each thread within the group of threads has completed executing on the processing unit.

One advantage of the disclosed technique is that texture processing hardware is capable of caching generic data retrieved for a group of threads for the duration of that group threads, thereby efficiently utilizing cache resources within the texture hardware.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
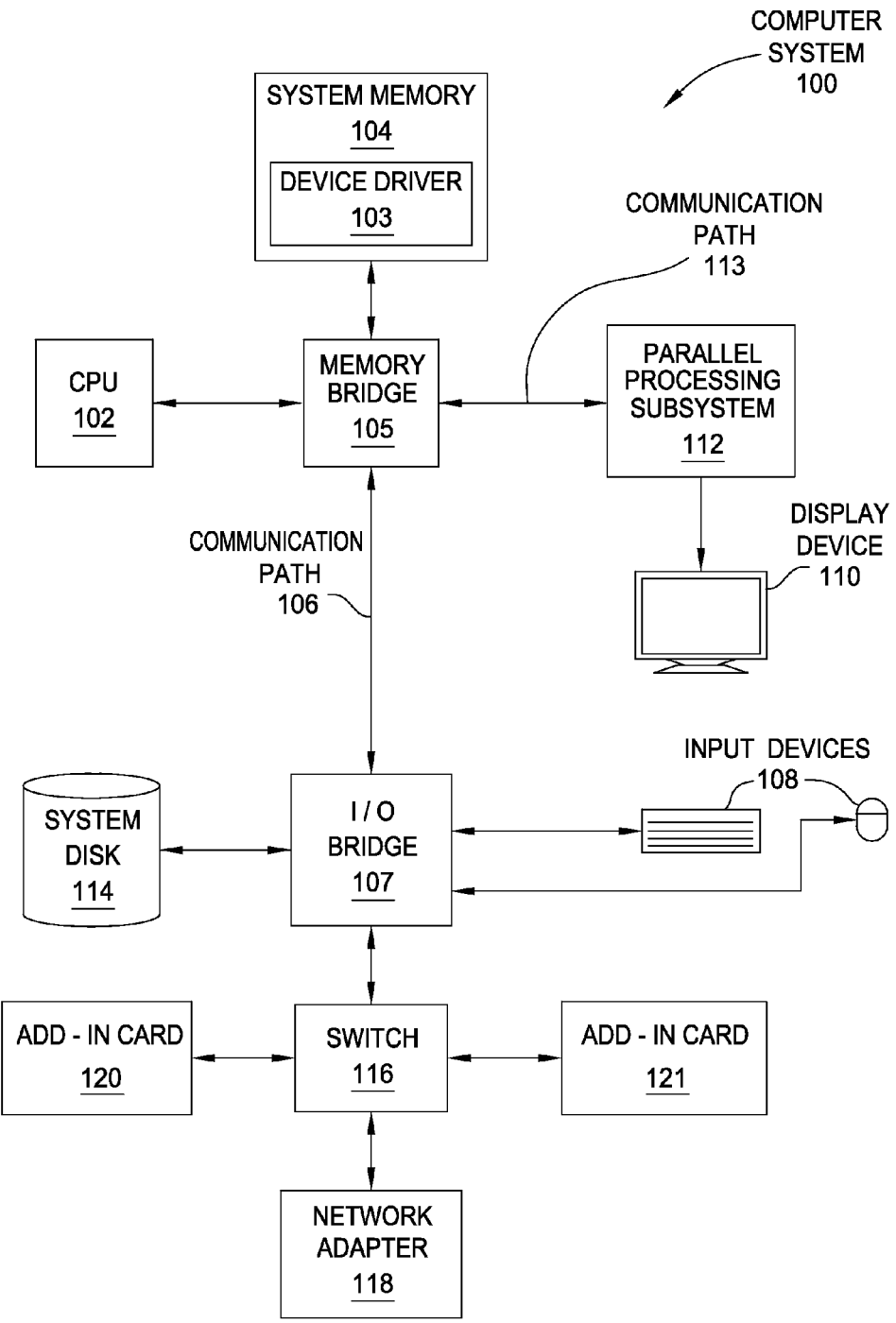
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
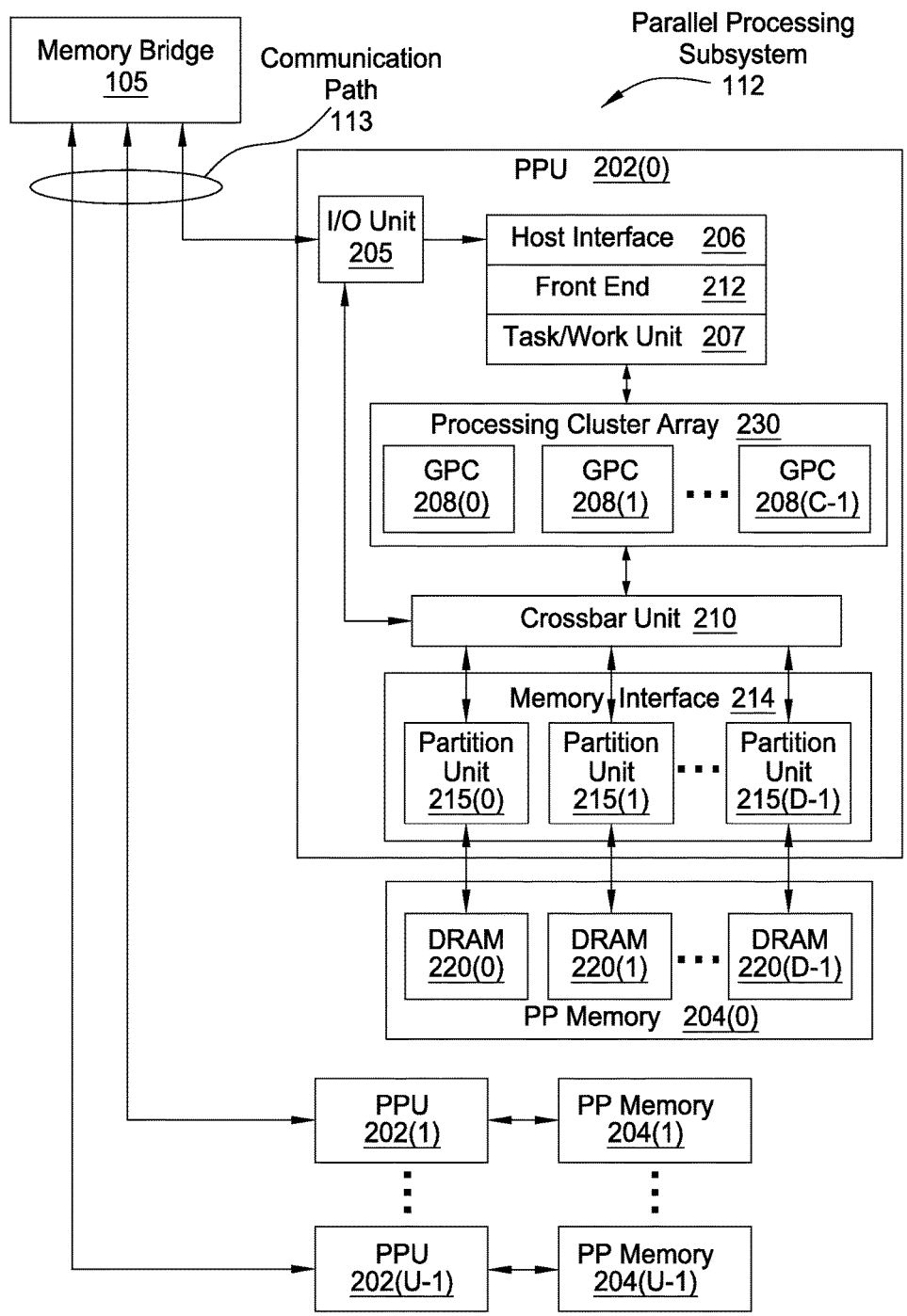
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals)

from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
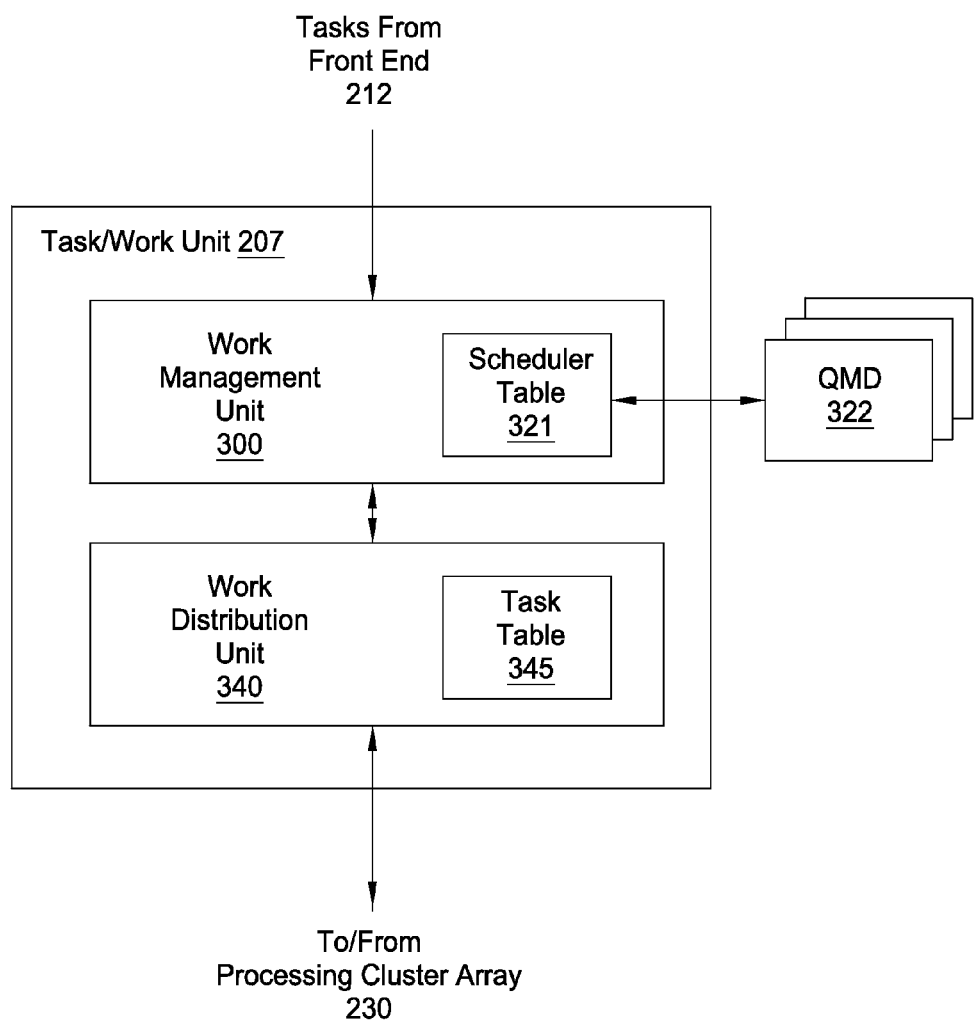
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
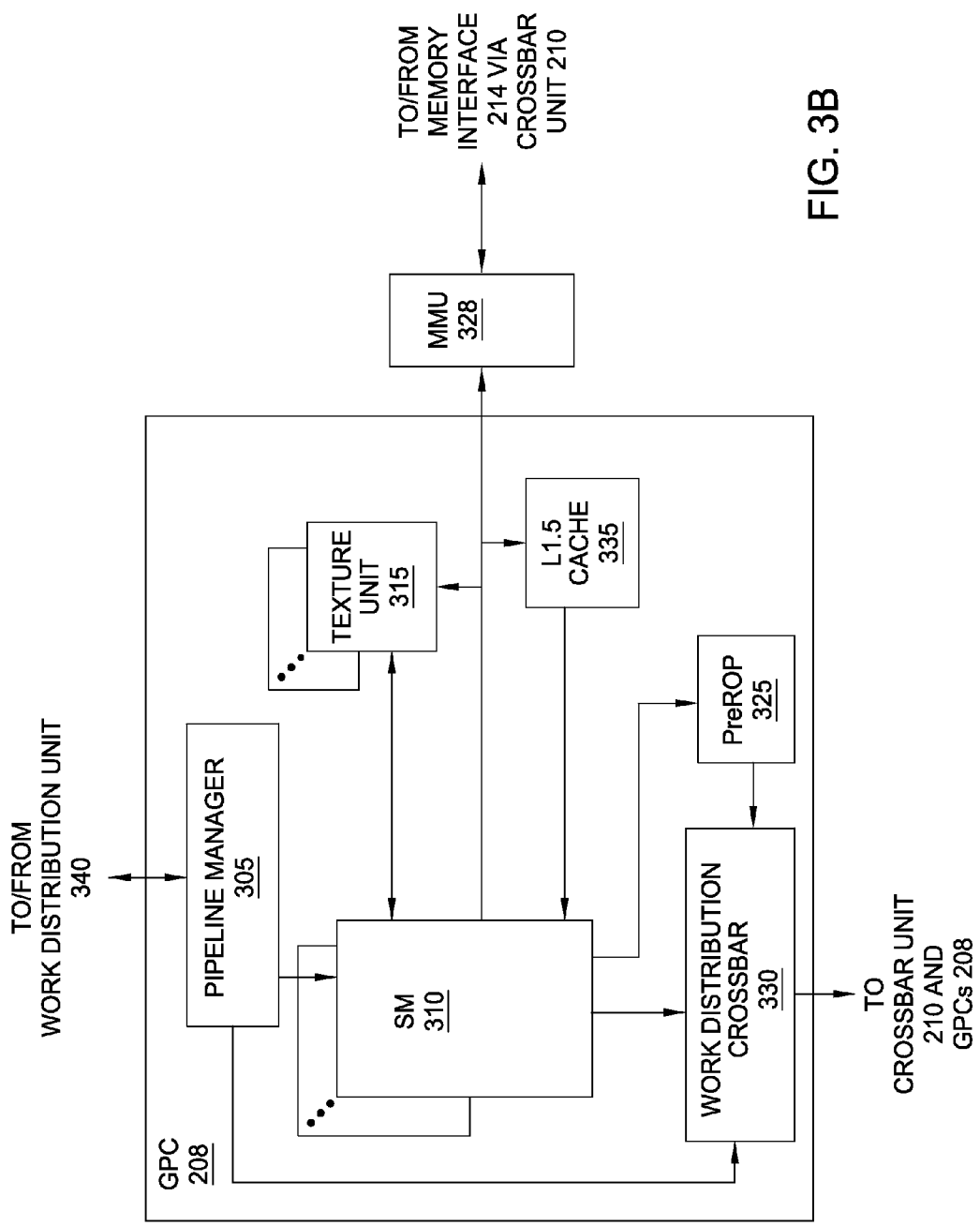
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
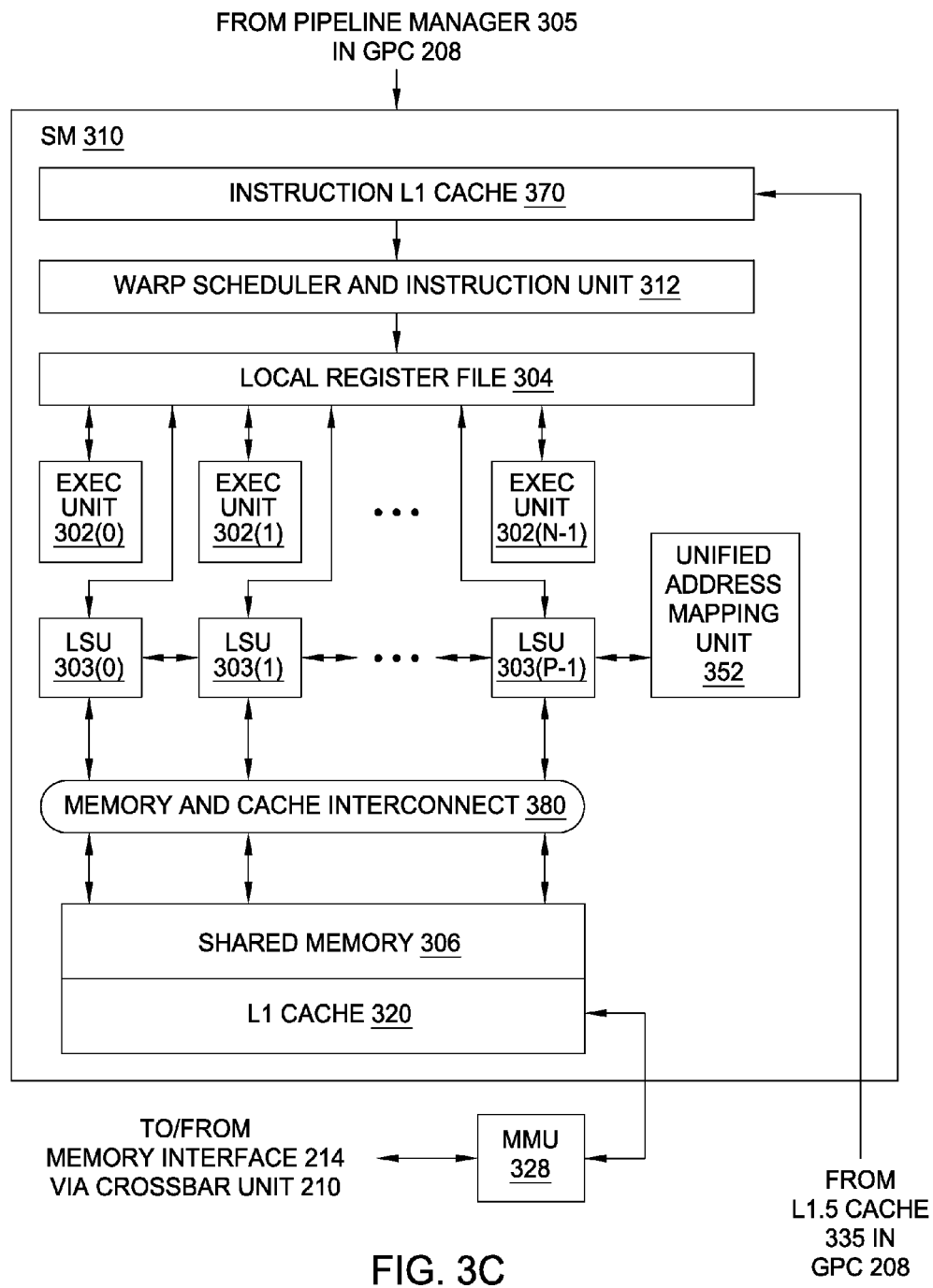
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Graphics Pipeline Architecture

Figure 4:
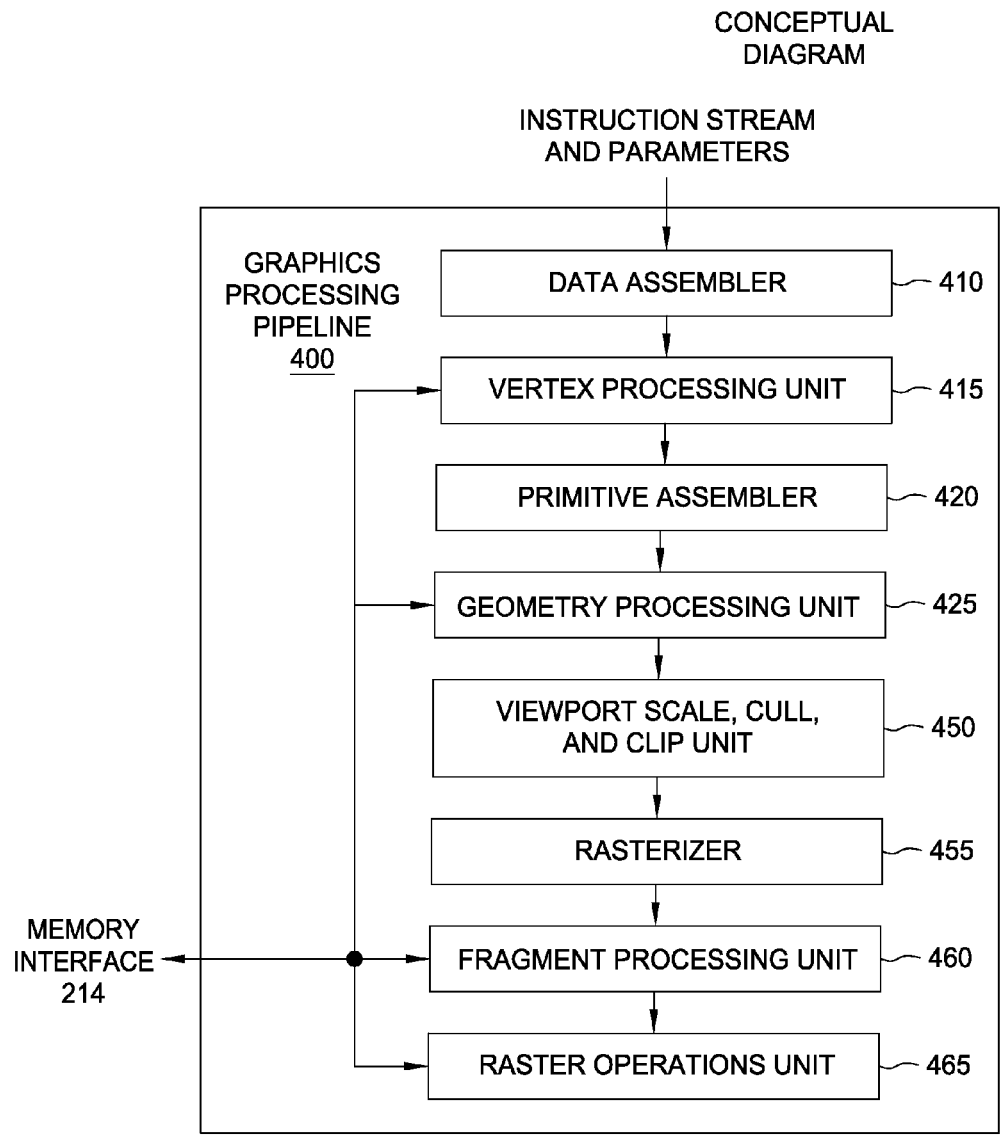
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400 that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. In one embodiment, fragment processing unit 460 operates in conjunction with texture unit 315 shown in FIG. 3B to perform texture mapping operations. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

As mentioned above in conjunction with FIG. 3B, texture unit 315 shown in FIG. 3B is configured to perform texture processing operations on behalf of SM 310 (also shown in FIG. 3B). In doing so, texture unit 315 is configured to read texture data from any of the memory units shown in FIGS. 1-3C. In addition, texture unit 315 can also be configured to perform global memory load operations in order to read arbitrary data from those memory units using existing texture data pathways. When SM 310 is configured to perform general purpose processing operations, texture unit 315 can be configured to implement a texture processing pipeline, discussed below in conjunction with FIG. 5. The texture processing pipeline discussed below allows texture unit 315 to read texture data or generic, global data via the same data pathway.

Performing Memory Access Operations Via Texture Hardware

Figure 5:
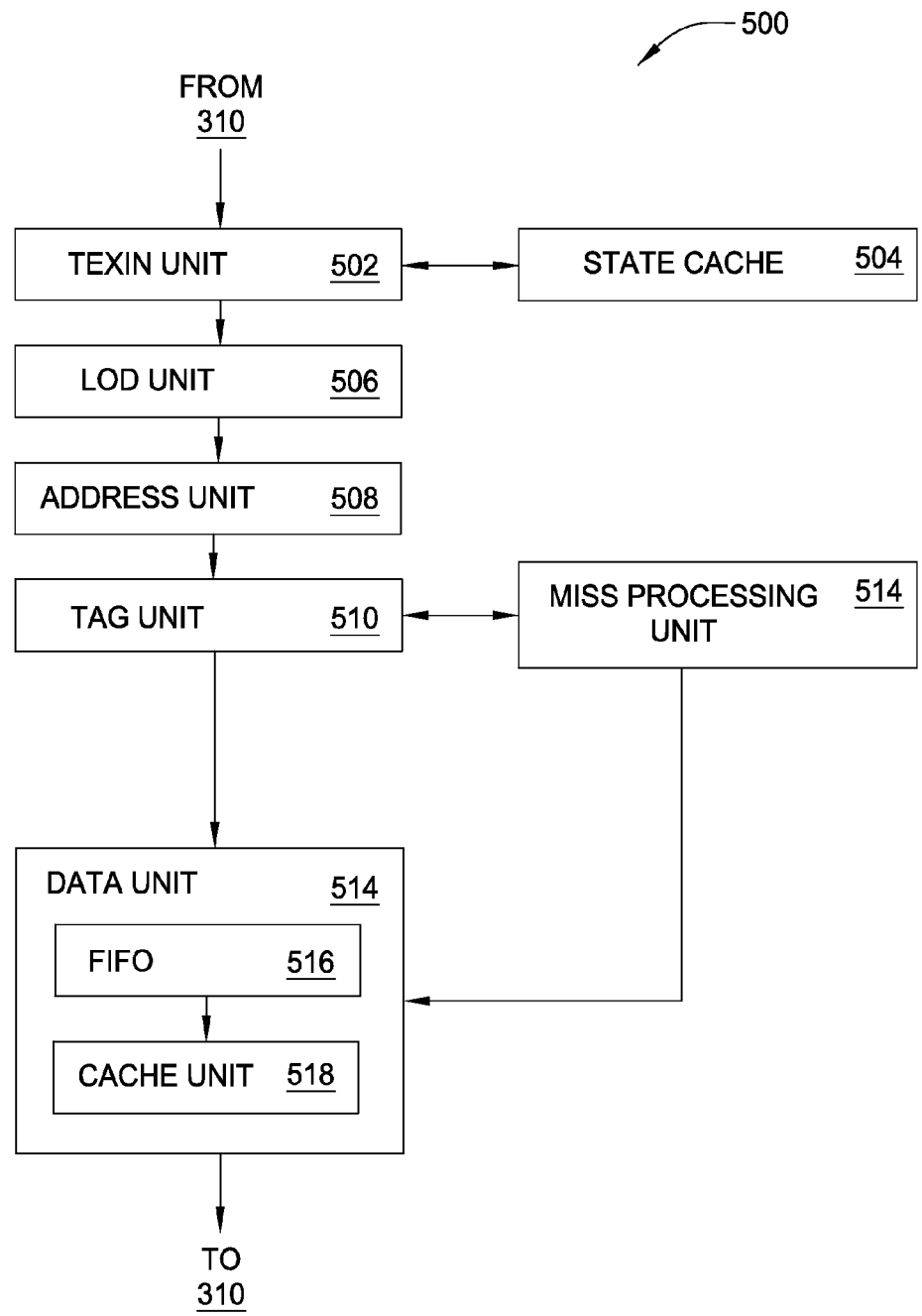
FIG. 5 is a conceptual diagram of a texture processing pipeline that a texture unit within the general processing cluster of FIG. 3B can be configured to implement, according to one embodiment of the present invention.

FIG. 5 is a conceptual diagram of a texture processing pipeline 500 that texture unit 315 within the general processing cluster 208 of FIG. 3B can be configured to implement, according to one embodiment of the present invention. As shown, texture processing pipeline 500 includes a texture input (TEXIN) unit 502 coupled to a state cache 504, a level of detail (LOD) unit 506, an address unit 508, a tag unit 510, a miss processing unit 512, and a data unit 514 that includes a first-in first-out (FIFO) 516 and a cache unit 518.

Texture processing pipeline 500 is configured to process memory access requests received from SM 310 shown in FIG. 3B. A given memory access request could represent a texture data access operation, such as, e.g., a read operation that reads a texture from memory. Alternatively, a given memory access request could represent a generic data access operation, such as, e.g., a global memory load operation.

A given memory access request includes a "state index" that TEXIN unit 502 uses to determine whether the memory access request represents a texture data access operation or a generic data access operation. When texture processing pipeline 500 receives a memory access request, TEXIN unit 502 extracts the state index from the memory access request and then compares a portion of the state index to a request state register within TEXIN unit 502. The request state register indicates a particular index associated with generic data access operations. When the state index associated with a given memory access request matches the request state register, TEXIN unit 502 configures texture processing pipeline 500 to perform a generic data access operation. TEXIN unit 502 may also modify the memory access request to reflect a particular level of caching for data associated with the generic data access operation. In one embodiment, TEXIN unit 502 is configured by a software application executing on SM 310 to modify memory access requests to reflect particular caching levels.

In situations where TEXIN unit 502 determines that the memory access request represents a texture data access operation, TEXIN unit 502 configures texture processing pipeline 500 to perform a texture data access operation. In one embodiment, a software application such as, e.g., driver 103 shown in FIG. 1 can be executed in order to configure the request state register.

When processing memory access requests that represent texture data access operations, TEXIN unit 502 uses the state index to access state cache 504. TEXIN unit 502 extracts from state cache 504 additional texture information that corresponds to the texture data to be accessed from memory. The additional texture information may include texel size, texture starting point, texture dimensions, and texture border data, among other types of texture-related information. TEXIN unit 502 may incorporate this additional texture information into the memory access request and then pass the memory access request to LOD unit 506.

LOD unit 506 is configured to compute a "level of detail" for the texture data to be accessed from memory based on the position and orientation of a set of coordinates included within the memory access request. The set of coordinates may represent the position and orientation of a texture residing within a graphics scene. LOD unit 506 may incorporate the computed level of detail into the memory access request and then pass the memory access request to address unit 508. Address unit 508 is configured to perform various address computations based on the coordinates within the memory access request. The results of the address computations may be used to identify an entry in a tag table included within tag unit 510. Address unit 508 passes the memory access request and address computation results to tag unit 510.

Tag unit 510 includes a tag table that stores a set of entries. Each entry represents a line within cache unit 518. Cache unit 518 may represent a cache memory residing within texture unit 315, or may also represent L1 cache 320 residing within SM 310 shown in FIG. 3C, among other cache memory units. Upon receiving the memory access request and address computation results from address unit 508, tag unit 510 determines whether the tag table includes an entry corresponding to the texture data to be retrieved. The tag table included within tag unit 510 is discussed in greater detail below in conjunction with FIG. 6.

When the tag table includes an entry corresponding to the texture data to be accessed, a cache hit occurs, and the tag unit 510 determines that texture data to be accessed resides in cache unit 518. Tag unit 510 retrieves the entry by searching the tag table and retrieves an offset within cache unit 518 where the texture data actually resides. That entry may include a u-coordinate and a v-coordinate. Tag unit 510 passes the offset to FIFO 516, and cache unit 518 may then provide the cached texture data to SM 310.

When the tag table does not include an entry corresponding to the texture data to be accessed, a cache miss occurs, and tag unit 510 causes miss processing unit 512 to access the requested texture data from global memory. Miss processing unit 512 may access the requested texture data by computing a virtual address based on data included within the memory access request, performing a virtual to physical address translation, and then reading the requested data from a physical location. In one embodiment, miss processing unit 512 resides within MMU 328 shown in FIG. 3B. Miss processing unit 512 may then populate cache unit 518 with the texture data accessed from global memory and update the tag table within tag unit 512 to reflect the newly-cached texture data. That texture data may then be provided to SM 310.

As mentioned above, texture processing pipeline 500 may also be configured to process generic data access operations that are not specifically associated with texture data, such as, e.g., global memory load operations, among others. When texture processing pipeline 500 receives a memory access request associated with a generic data access operation, TEXIN unit 502 determines that the memory access request is associated with a generic data access operations based on the state index included within the memory access request, i.e. by comparing the state index to the request state register, in like fashion as described above. As also described, TEXIN unit 502 may also modify the memory access request to reflect a particular level of caching for data associated with the generic data access operation.

When TEXIN unit 502 determines that the memory access request is associated with a generic data access operation, TEXIN unit 502 then configures texture processing pipeline 500 accordingly. In doing so, TEXIN unit 502 may cause LOD unit 506 to pass the memory access request directly to address unit 508 (i.e., without performing any processing operations with the memory access request). TEXIN unit 502 may also cause address unit 508 to pass the memory access request from LOD unit 506 directly to tag unit 510 (i.e., without performing any processing operations with the memory access request). In this fashion, the memory access request may effectively bypass LOD unit 506 and address unit 508.

Tag unit 510 receives the memory access request and extracts a virtual address included within the memory access request. The virtual address corresponds to generic data to be retrieved by performing the generic data access operation associated with the memory access request. Tag unit 510 then determines whether the tag table includes an entry corresponding to extracted virtual address. The tag table is configured to store entries associated with texture data, as discussed above, as well as virtual addresses associated with generic data. As mentioned above, the tag table within tag unit 510 is discussed in greater detail below in conjunction with FIG. 6.

When the tag table includes an entry corresponding to the extracted virtual address, a cache hit occurs, and the generic data to be retrieved resides in cache unit 518. Tag unit 510 extracts an offset from the virtual address and pushes that offset into FIFO 516. Data unit 514 may pop that offset from FIFO 516 when pre-existing offsets within FIFO 516 have exited FIFO 516, and then retrieve the requested data from cache unit 518 based on the offset. Data unit 514 may then provide the data associated with that offset to SM 310.

When the tag table does not include an entry corresponding to the extracted virtual address, a cache miss occurs, and tag unit 510 causes miss processing unit 512 to retrieve the requested generic data from global memory, i.e. by performing a virtual to physical address translation and reading the requested data from a physical location. Miss processing unit 512 may then populate cache unit 518 with the retrieved generic data and update the tag table within tag unit 512 to reflect the newly-cached generic data. That generic data may then be provided to SM 310.

By implementing texture processing pipeline 500, as discussed above, texture unit 315 can be configured to perform texture data access operations as well as generic data access operations via the same data pathway. In addition, software executing on CPU 102 and/or parallel processing subsystem 112, including driver 103, can be configured to include simplified memory access commands that expose the generic data access operations to a software developer. With this approach, the software developer is capable of generating program code that includes generic memory access operations that can be serviced by SM 310 and texture processing pipeline 500. Moreover, the software developer is not required to include any texture-oriented program code in order to implement those memory access operations.

Figure 6:
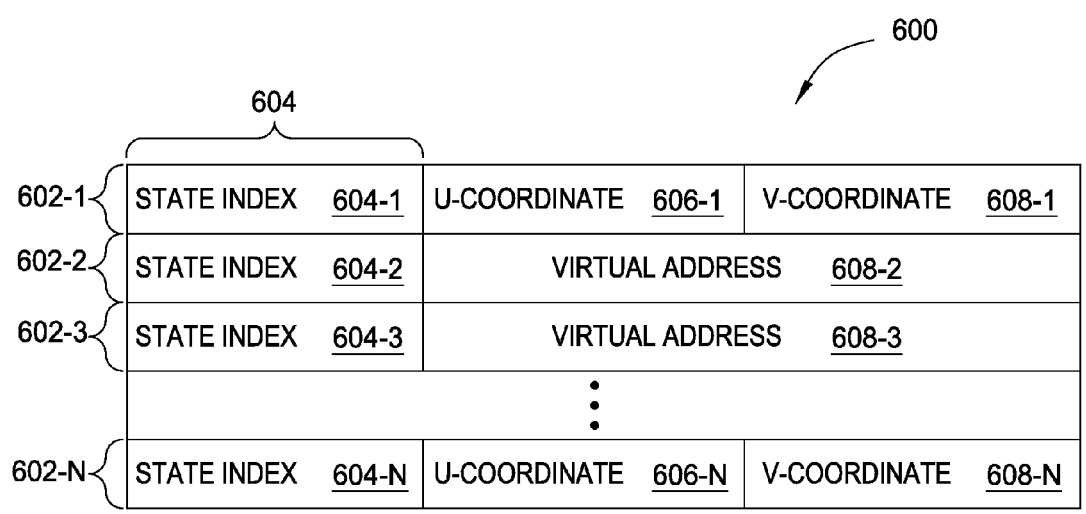
FIG. 6 is a conceptual diagram of a tag table, according to one embodiment of the present invention.

FIG. 6 is a conceptual diagram of a tag table 600 discussed above in conjunction with FIG. 5, according to one embodiment of the present invention. As shown, tag table 600 includes a set of entries 602-1, 602-2, 602-3, and 602-N. Each entry 602 includes a corresponding state index 604. Entry 602-1 includes state index 604-1, entry 602-2 includes state index 604-2, entry 602-3 includes state index 604-3, and entry 602-N includes state index 604-N. Each entry 602 corresponds to a portion of data stored in cache unit 518 shown in FIG. 5. The portion of data stored in cache unit 518 may be texture data or generic data.

A given entry 602 that corresponds to texture data includes a u-coordinate 606 as well as a v-coordinate 608. As is shown, entry 602-1 corresponds to texture data and therefore includes u-coordinate 606-1 and v-coordinate 608-1. Likewise, entry 602-N corresponds to texture data and therefore includes u-coordinate 606-N and v-coordinate 608-N. A given entry 602 that corresponds to generic data includes a virtual address 610 associated with that generic data. As is shown, entry 602-2 corresponds to generic data and therefore includes a virtual address 610-2, while entry 602-3 also corresponds to generic data and therefore includes a virtual address 610-3.

When texture processing pipeline 500 shown in FIG. 5 is configured to process memory access requests, as discussed above in conjunction with FIG. 5, tag unit 510 may query tag table 600 for each such memory access request. For a given memory access request, tag unit 510 queries tag table 600 in order to determine whether data to be retrieved in conjunction with that memory access request resides in cache unit 518 or should be retrieved from global memory.

When a given memory access request represents a texture data access operation, tag unit 510 may identify an entry 602 within tag table 600, indicating a cache hit. Tag unit 510 may then extract a cache address for the texture data to be retrieved from within that entry. When a given memory access request represents a generic data access operation, tag unit 510 may also identify an entry 602 within tag table 600, indicating a cache hit. Tag unit 510 may then extract a cache address for the texture data to be retrieved from within that entry.

With the above approach, texture data and generic data alike may be cached within cache unit 518 and managed via tag table 600. Referring back now to FIG. 5, texture processing pipeline 500 may be implemented by texture unit 315 shown in FIG. 3B when SM 310 (also shown in FIG. 3B) executes one or more thread groups. A given thread group may perform texture data access operations or generic data access operations via the techniques described above in conjunction with FIG. 5.

When processing a memory access request that represents a generic data access operation on behalf of a thread within a given thread group, tag unit 510 may determine that the generic data indicated by the memory access request does not reside within cache unit 518 (i.e., a cache miss occurs). In response, tag unit 510 is configured to cause miss processing unit 512 to retrieve the global data and store that data within cache unit 518, as previously discussed. By caching data associated with a given thread within the thread group, tag unit 510 may enable other threads within that thread group to access a cached version of the data retrieved for the given thread. With this approach, tag unit 510 may prevent situations where each thread within the thread group attempts to access the same portion of data, thereby causing multiple concurrent cache misses for the same portion of data. Such a situation could result in miss processing unit 512 retrieving that same portion of data multiple different times (i.e. once for each thread).

In addition, when caching generic data on behalf of a given thread group, tag unit 510 is configured to update tag table 600 to reflect that the cached data is only cached for the duration of the thread group for which the data was retrieved. Since generic data cached for a given thread group may not be required by subsequent thread groups, that data may be invalidated upon exit of the thread group, thereby conserving cache resources. In one embodiment, state index 604 associated with a given entry within tag table 600 indicates whether the data associated with that entry is cached for the duration of the current thread group or cached for more than one thread group. In another embodiment, TEXIN unit 502 updates the memory access request based on the state index to include a label indicating a level of caching for data associated with the memory access request, and tag unit 510 incorporates that label into an entry within the tag table that is associated with the memory access request.

The techniques described for performing generic data access operations via texture pipeline 500 and for invalidating generic data cached for the duration of a thread group are described in greater detail below in conjunction with FIG. 7 and FIG. 8, respectively.

Figure 7:
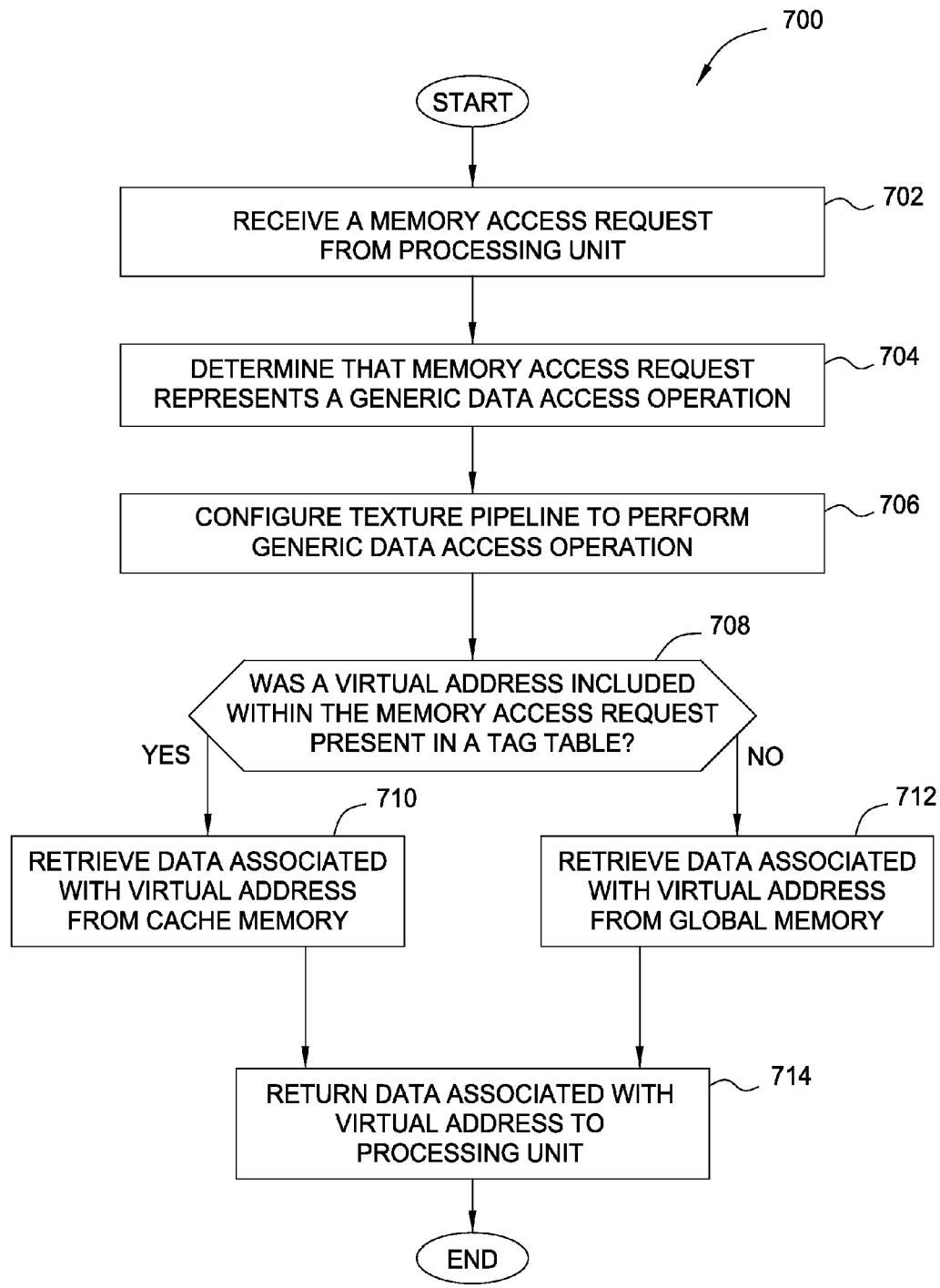
FIG. 7 is a flow diagram of method steps for performing a memory access operation via the texture processing pipeline shown in FIG. 5, according to one embodiment of the present invention.

FIG. 7 is a flow diagram of method steps for performing a global memory load operation via the texture processing pipeline shown in FIG. 5, according to one embodiment of the present invention. Although the method steps are described in conjunction with the systems of FIGS. 1, 2, 3A, 3B, and 3C, persons of ordinary skill in the art will understand that any system configured to perform the method steps, in any order, is within the scope of the inventions.

As shown, a method 700 begins at step 702, where TEXIN unit 502 within texture processing pipeline 500 receives a memory access request from SM 310. The memory access request may represent a texture data access operation or may represent a generic data access operation.

At step 704, TEXIN unit 502 determines that the memory access request represents a generic data access operation. In one embodiment, TEXIN unit 502 extracts a state index from the memory access request and compares a portion of the state index to a request register in order to determine that the memory access request represents a generic data access operation. The request register stores a state index that corresponds to generic data access operations and may be configured by a software application executing on SM 310.

At step 706, TEXIN unit 502 configures texture processing pipeline 500 to perform a generic data access operation. In doing so, TEXIN unit 502 may cause LOD unit 506 and address unit 508 to simply pass a received memory access request to a subsequent unit in texture processing pipeline 500 without performing any processing operations on that memory access request. In this fashion, TEXIN unit 502 may cause the memory access request to bypass LOD unit 506 and address unit 508.

At step 708, tag unit 510 within texture processing pipeline 500 extracts a virtual address from the memory access request and determines whether the virtual address is present in a tag table. The tag table could be, e.g., tag table 600 shown in FIG. 6. If tag unit 510 determines that the virtual address is present in the tag table, a cache hit occurs, and the method 700 proceeds to step 710.

At step 710, tag unit 510 causes data unit 514 to retrieve the data associated with the virtual address from cache unit 518. Tag unit 510 may push an offset associated with the virtual address into FIFO 516, and data unit 514 may then pop the offset from FIFO 516 when pre-existing offsets within FIFO 516 have exited FIFO 516. Data unit 514 may then retrieve the requested data from cache unit 518 based on that offset. The method 700 then proceeds to step 714, where data unit 514 provides the cached data to SM 310.

At step 708, if tag unit 510 determines that the virtual address is not present in the tag table, a cache miss occurs, and the method 700 proceeds to step 712. At step 712, miss processing unit 512 retrieves the request data from global memory. In doing so, miss processing unit 514 may perform a virtual-to-physical address translation and then access the requested data from a physical location. Miss processing unit 514 is configured to cache the requested data in cache unit 518. The method then proceeds to step 714, where data unit 514 provides the newly-cached data to SM 310, in like fashion as described above.

Figure 8:
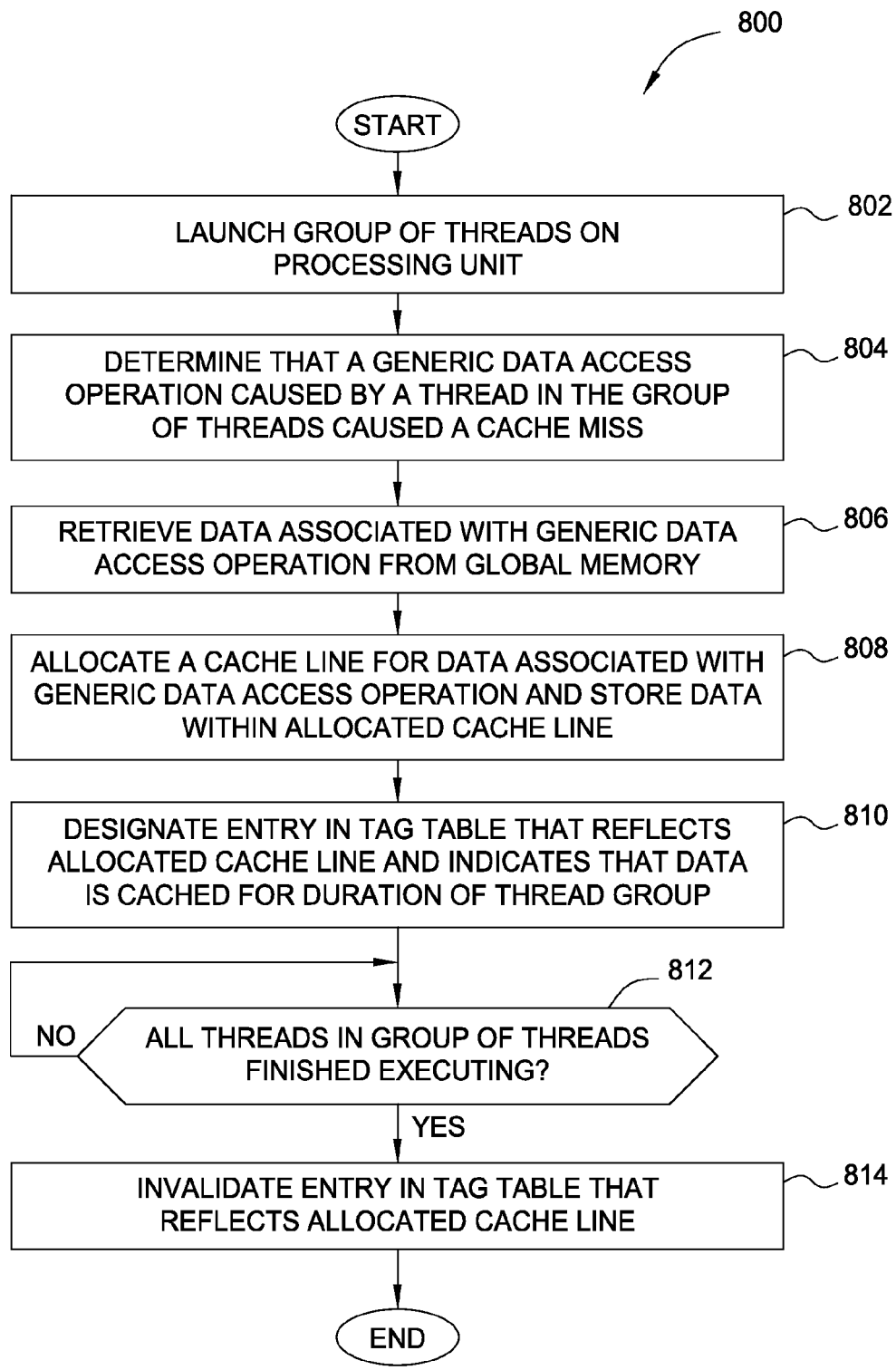
FIG. 8 is a flow diagram of method steps for caching and invalidating data associated with a group of threads executing on the streaming multiprocessor shown in FIG. 3B, according to one embodiment of the present invention.

By implementing the method 700, texture unit 315 can be configured to implement texture processing pipeline 500 in order to perform texture data access operations as well as generic data access operations via the same data pathway FIG. 8 is a flow diagram of method steps for caching and invalidating data associated with a group of threads executing on the streaming multiprocessor shown in FIG. 3B, according to one embodiment of the present invention. Although the method steps are described in conjunction with the systems of FIGS. 1, 2, 3A, 3B, and 3C, persons of ordinary skill in the art will understand that any system configured to perform the method steps, in any order, is within the scope of the inventions.

As shown, a method 800 begins at step 802, where SM 310 launches a group of threads. The group of threads may generate memory access requests that represent texture data access operations or generic data access operations. SM 310 is configured to cause texture unit 315 to service those memory access requests. In doing so, texture unit 315 may implement texture processing pipeline 500 shown in FIG. 5 and may perform the method 700 discussed above in conjunction with FIG. 7.

At step 804, tag unit 510 within texture processing pipeline 500 determines that a generic data access operation generated by a thread within the group of threads caused a cache miss to occur. The generic data access operation is represented by a memory access operation received by texture processing pipeline 500 from the thread within the group of threads. The memory access operation includes a virtual address that corresponds to the data to be retrieved. Tag unit 510 is configured to determine that a cache miss occurred by determining that the virtual address is not present in a tag table included within tag unit 510.

At step 806, tag unit 510 causes miss processing unit 512 to retrieve data associated with the generic data access operation from global memory. In doing so, miss processing unit 512 may translate the virtual address included within the memory access request into a physical address. Miss processing unit 512 may then read the requested data from a physical location associated with that physical address.

At step 808, tag unit 510 allocates a cache line within cache unit 518 to store the data retrieved by miss processing unit 512 and then causes that data to be stored within the allocated cache line. At step 810, tag unit 510 designates an entry within the tag table included within tag unit 510 for the newly-cached data. The tag table could be, e.g., tag table 600 shown in FIG. 6. The designated entry indicates that the newly-cached data is only cached for the duration of the thread group that includes the thread responsible for causing the cache miss. In one embodiment, the memory access request generated by the thread within the thread group indicates a caching level to be associated with the newly-cached data, including an eviction policy, among other things.

The method 800 waits at step 812 until all threads within the thread group have finished executing. When the last thread or subset of threads within the thread group exit, the method 800 proceeds to step 814, where tag unit 510 invalidates the entry within cache unit 518 associated with the data retrieved on behalf of the thread group. The generic data cached on behalf of the group of threads may then be flushed from cache unit 518. The method 800 then ends.

With this approach, data retrieved when processing a generic data access operation for threads within a thread group may be cached for the duration of the thread group and then invalidated once the thread group exits. Such functionality may prevent multiple cache misses caused by different threads within the thread group, and may result better cache resource usage.

In sum, a texture processing pipeline can be configured to service memory access requests that represent texture data access operations or generic data access operations. When the texture processing pipeline receives a memory access request that represents a texture data access operation, the texture processing pipeline may retrieve texture data based on texture coordinates. When the memory access request represents a generic data access operation, the texture pipeline extracts a virtual address from the memory access request and then retrieves data based on the virtual address. The texture processing pipeline is also configured to cache generic data retrieved on behalf of a group of threads and to then invalidate that generic data when the group of threads exits.

Advantageously, texture hardware within a graphics processing unit (GPU) can be configured to perform generic data access operations. This approach enables a software developer to generate program code that leverages the parallel architecture of the GPU without being required to implement texture-oriented memory access operations. In addition, the texture hardware is capable of caching generic data retrieved for a group of threads for the duration of that group threads, thereby efficiently utilizing cache resources within the texture hardware.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer implemented method for performing a generic data access operation for a group of threads executing on a processor, the method comprising:
   receiving a memory access request from a thread within the group of threads;
   determining that a portion of data associated with the memory access request is not present in a cache memory unit;
   retrieving the portion of data associated with the memory access request from global memory;
   storing the portion of data within the cache memory unit during execution of the group of threads on the processor;
   designating an entry in a tag table to reflect a location associated with the portion of data within the cache memory unit, wherein the entry further indicates that the entry in the tag table should be invalidated when each thread within the group of threads has completed executing on the processor;
   flushing the portion of data from the cache memory unit upon determining that each thread within the group of threads has completed executing on the processing unit; and
   invalidating the entry in the tag table upon determining that each thread within the group of threads has completed executing on the processor.

2. The computer-implemented method of claim 1, wherein determining that the portion of data associated with the first memory access request is not present in the cache memory unit comprises determining that a virtual address included within the memory access request is not present within a tag table.

3. The computer-implemented method of claim 2, wherein retrieving the portion of data associated with the memory access request from global memory comprises:
   translating the virtual address included within the memory access request into a physical address; and retrieving the portion of data from a physical location associated with the physical address.

4. The computer-implemented method of claim 1, wherein the entry in the tag table reflects a configurable caching level associated with the memory access request.

5. The computer-implemented method of claim 1, wherein the processor is configured to implement a texture processing pipeline, each thread within the group of threads is configured to execute on the texture processing pipeline, and further comprising configuring the texture processing pipeline to perform generic, non-texture data access operations for threads within the group of threads instead of texture data access operations.

6. The computer-implemented method of claim 1, wherein the memory access request comprises a generic, non-texture data access operation.

7. A non-transitory computer-readable medium storing program instructions that, when executed by a processor, cause the processor to perform a generic data access operation for a group of threads executing on the processor by performing the steps of:
receiving a memory access request from a thread within the group of threads;
determining that a portion of data associated with the memory access request is not present in a cache memory unit;
retrieving the portion of data associated with the memory access request from global memory;
storing the portion of data within the cache memory unit during execution of the group of threads on the processor;
designating an entry in a tag table to reflect a location associated with the portion of data within the cache memory unit, wherein the entry further indicates that the entry in the tag table should be invalidated when each thread within the group of threads has completed executing on the processor;
flushing the portion of data from the cache memory unit upon determining that each thread within the group of threads has completed executing on the processing unit; and
invalidating the entry in the tag table upon determining that each thread within the group of threads has completed executing on the processor.

8. The non-transitory computer-readable medium of claim 7, wherein the step of determining that the portion of data associated with the first memory access request is not present in the cache memory unit comprises determining that a virtual address included within the memory access request is not present within a tag table.

9. The non-transitory computer-readable medium of claim 7, wherein the step of retrieving the portion of data associated with the memory access request from global memory comprises:
translating the virtual address included within the memory access request into a physical address; and
retrieving the portion of data from a physical location associated with the physical address.

10. The non-transitory computer-readable medium of claim 7, wherein the entry in the tag table reflects a configurable caching level associated with the memory access request.

11. The non-transitory computer-readable medium of claim 7, wherein the processor is configured to implement a texture processing pipeline, each thread within the group of threads is configured to execute on the texture processing pipeline, and further comprising the step of configuring the texture processing pipeline to perform generic, non-texture data access operations for threads within the group of threads instead of texture data access operations.

12. The non-transitory computer-readable medium of claim 11, wherein the memory access request comprises a generic, non-texture data access operation.

13. A computing device configured to perform a generic data access operation for a group of threads executing on a processor, including:
a memory storing instructions; and
the processor, which is coupled to the memory and, when executing the instructions, is configured to:
receive a memory access request from a thread within the group of threads,
determine that a portion of data associated with the memory access request is not present in a cache memory unit,
retrieve the portion of data associated with the memory access request from global memory,
store the portion of data within the cache memory unit during execution of the group of threads on the processor,
designate an entry in a tag table to reflect a location associated with the portion of data within the cache memory unit, wherein the entry further indicates that the entry in the tag table should be invalidated when each thread within the group of threads has completed executing on the processor;
flush the portion of data from the cache memory unit upon determining that each thread within the group of threads has completed executing on the processing unit; and
invalidate the entry in the tag table upon determining that each thread within the group of threads has completed executing on the processor.

14. The computing device of claim 13, wherein the processor is configured to determine that the portion of data associated with the first memory access request is not present in the cache memory unit by determining that a virtual address included within the memory access request is not present within a tag table.

15. The computing device of claim 13, wherein the processor is configured to retrieve the portion of data associated with the memory access request from global memory by:
translating the virtual address included within the memory access request into a physical address; and
retrieving the portion of data from a physical location associated with the physical address.

* * * * *